United States Patent
Allen et al.

(10) Patent No.: US 9,911,149 B2
(45) Date of Patent: Mar. 6, 2018

(54) SYSTEMS AND METHODS FOR ONLINE SHOPPING CART MANAGEMENT

(71) Applicant: PAYPAL, INC., San Jose, CA (US)

(72) Inventors: Anthony Shakrala Allen, Danville, CA (US); Norihiro Edwin Aoki, Sunnyvale, CA (US)

(73) Assignee: PAYPAL, INC., San Jose, CA (US)

( * ) Notice: Subject to any disclaimer, the term of this patent is extended or adjusted under 35 U.S.C. 154(b) by 453 days.

(21) Appl. No.: 14/602,228

(22) Filed: Jan. 21, 2015

(65) Prior Publication Data
US 2016/0210674 A1    Jul. 21, 2016

(51) Int. Cl.
  *G06Q 30/06*  (2012.01)
  *G06Q 20/12*  (2012.01)

(52) U.S. Cl.
  CPC ......... *G06Q 30/0633* (2013.01); *G06Q 20/12* (2013.01); *G06Q 30/0605* (2013.01); *G06Q 30/0631* (2013.01); *G06Q 30/0635* (2013.01); *G06Q 30/0641* (2013.01)

(58) Field of Classification Search
  CPC ............ G06C 30/06; G06C 30/0601–30/0643
  See application file for complete search history.

(56) References Cited

U.S. PATENT DOCUMENTS 5,966,697 A    10/1999    Fergerson et al.
7,792,709 B1    9/2010    Trandal et al.
8,117,089 B2 *  2/2012    Minsky .............. G06Q 30/0603
                                                    705/27.1
9,189,811 B1 *  11/2015    Bhosle .............. G06Q 30/0631
2002/0087430 A1    7/2002    Davis et al.
(Continued)

FOREIGN PATENT DOCUMENTS

JP    2006-031655    2/2006
KR    10-2000-0054768    9/2000
(Continued)

OTHER PUBLICATIONS

A Method for Sharing a Dynamic Integrated Shopping List and Preventing Duplicated Purchases in Real-time, Nov. 17, 2009, IP.com Prior Art Database.*
(Continued)

*Primary Examiner* — William J Allen
*Assistant Examiner* — Timothy Kang
(74) *Attorney, Agent, or Firm* — Haynes and Boone, LLP

(57) ABSTRACT

Systems and methods for online shopping cart management are provided. According to an embodiment, a shopping cart system receives cart information for one or more items selected by a user on a plurality of merchant websites. The shopping cart system determines related items among the one or more items to populate different carts of the user. In response to receiving a checkout request for a cart containing an item related to other items, the shopping cart system provides an option to check out the other related items. The user may initiate, and the shopping cart system may process, a payment request for items in the checked-out cart. In some embodiments, the shopping cart system may remove items similar to the purchased items from the remaining carts. In further embodiments, the shopping cart system may automatically check out one of the carts after a predetermined amount of time.

20 Claims, 7 Drawing Sheets

(56) References Cited

U.S. PATENT DOCUMENTS

| | | | |
|---|---|---|---|
| 2002/0152137 A1 | 10/2002 | Lindquist et al. | |
| 2003/0028451 A1 | 2/2003 | Ananian | |
| 2003/0065577 A1* | 4/2003 | Haynes | G06Q 30/06 705/26.8 |
| 2003/0212609 A1 | 11/2003 | Blair et al. | |
| 2004/0117294 A1 | 6/2004 | Ferraro et al. | |
| 2004/0254855 A1 | 12/2004 | Shah | |
| 2006/0085275 A1 | 4/2006 | Stokes et al. | |
| 2006/0184430 A1 | 8/2006 | Gavarini | |
| 2008/0162345 A1 | 7/2008 | Passanha | |
| 2008/0168008 A1 | 7/2008 | Brown | |
| 2009/0043674 A1 | 2/2009 | Minsky et al. | |
| 2009/0064009 A1 | 3/2009 | Krantz et al. | |
| 2010/0030578 A1 | 2/2010 | Siddique et al. | |
| 2010/0082456 A1 | 4/2010 | Chung | |
| 2010/0138320 A1 | 6/2010 | Gavarini | |
| 2012/0265637 A1* | 10/2012 | Moeggenberg | G06Q 30/02 705/26.8 |
| 2013/0117149 A1* | 5/2013 | Gupta | G06Q 30/06 705/26.8 |
| 2014/0019298 A1* | 1/2014 | Suchet | G06Q 30/0633 705/26.8 |
| 2016/0239886 A1 | 8/2016 | Susilo et al. | |

FOREIGN PATENT DOCUMENTS

| | | |
|---|---|---|
| KR | 10-2008-0064242 | 7/2008 |
| KR | 10-2009-0008777 | 1/2009 |
| WO | WO 97/26729 | 7/1997 |

OTHER PUBLICATIONS

Homepage Framework Technote, [online]. [retrieved on Dec. 25, 2007]. Retrieved from the Internet: URL:http://www.technote.co.kr/php/technote1/board.php?board=skinmarket&command=body&no=33.

* cited by examiner

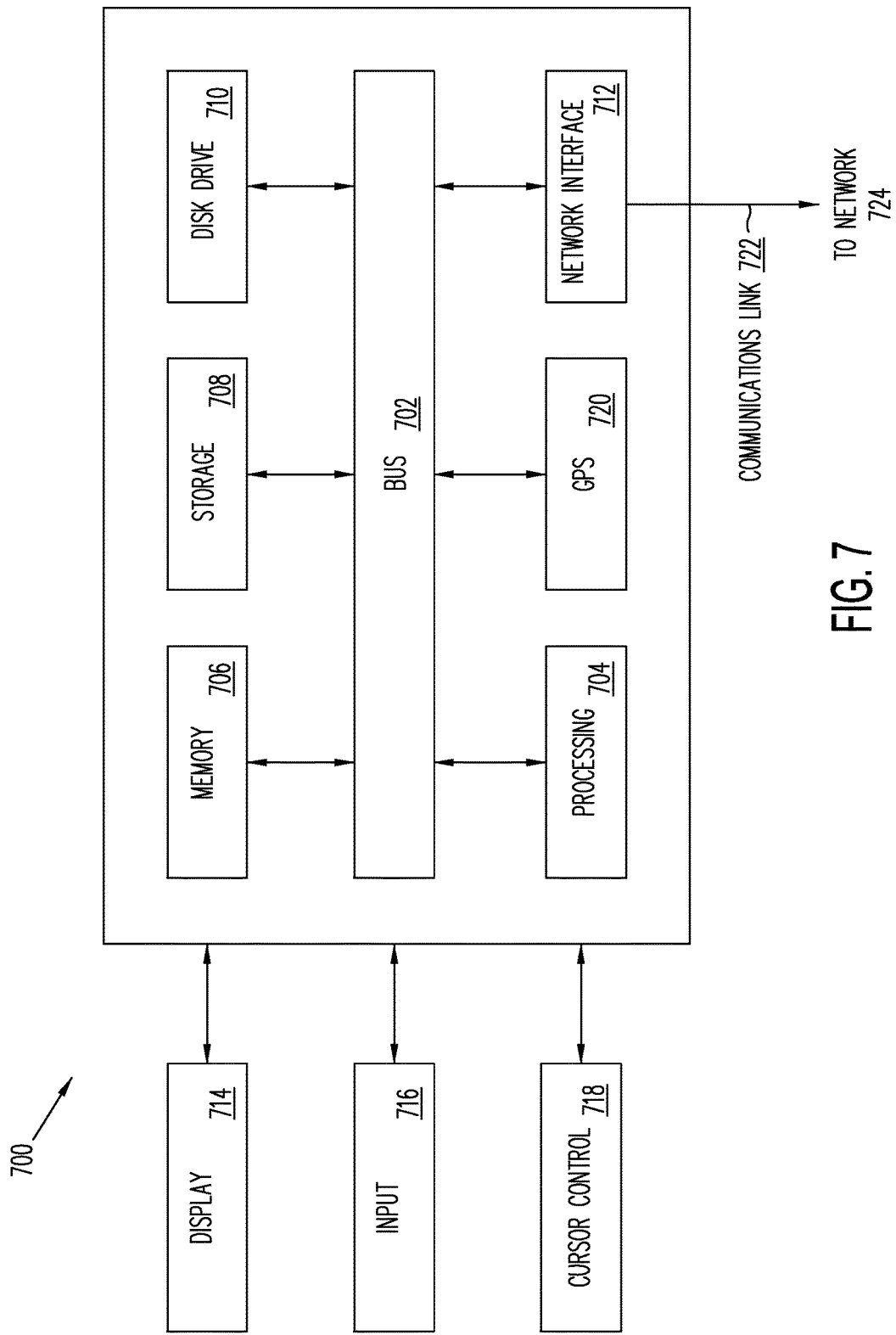

SYSTEMS AND METHODS FOR ONLINE SHOPPING CART MANAGEMENT

BACKGROUND

Field of the Invention

The present invention generally relates to online shopping systems and methods, and more particularly to systems and methods for online shopping cart management.

Related Art

Many users make purchases online on merchant websites that offer items for purchase. A user may want to purchase a group of related items. For example, for a ski trip, a user may want to buy winter clothes (e.g., a sweater, boots, a ski jacket, etc.), winter sporting goods (e.g., skis, goggles, etc.), and winter car equipment (e.g., an ice scrapper, snow tire chains, etc.). However, one merchant website may not offer all the items or may not offer the best selection or deals on some of the items, so the user may have to go to more than one website to purchase the items.

BRIEF DESCRIPTION OF THE FIGURES

FIG. 7 is a block diagram of a system for implementing one or more components in FIG. 1 according to an embodiment of the present disclosure.

Figure 1:
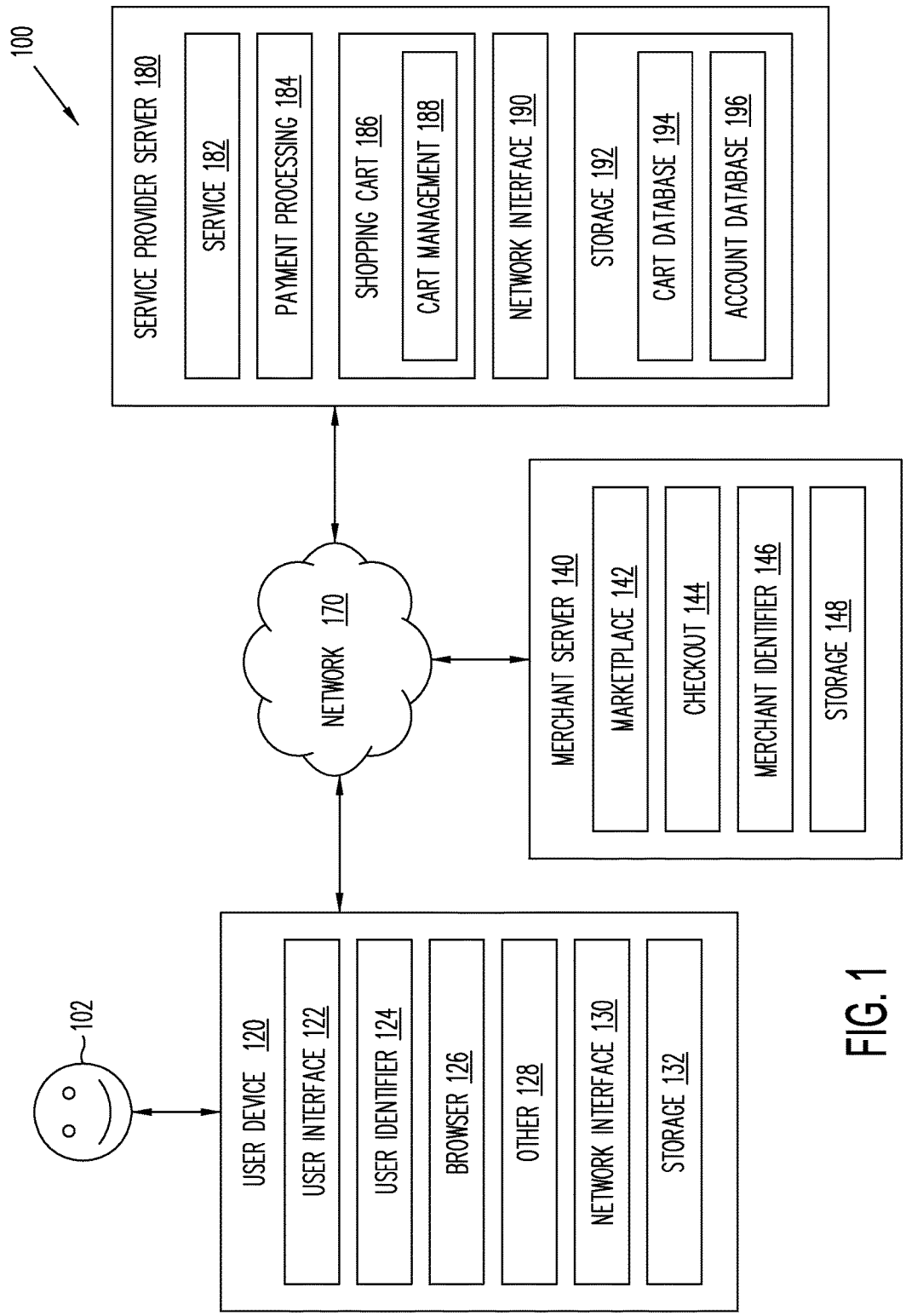
FIG. 1 is a block diagram of a network-based system for online shopping cart management according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides improved online shopping systems and methods and, in particular, systems and methods for online shopping cart management.

In various embodiments, a user may utilize shopping cart services on a shopping cart system, which may be provided by a service provider. The shopping cart system may be implemented, at least in part, as a service provider server associated with the service provider. A shopping cart may be associated with the user and not a merchant, so that the shopping cart may be used to select items, such as goods and services, on multiple merchant websites and make payment to multiple merchants associated with the merchant websites.

For example, a user may use a user device to access shopping cart services of a service provider. The user may select items on a merchant website to add to a shopping cart. The user may then go to another website to select additional items on the other merchant website to add to the same shopping cart. Upon checkout, the user may make a single payment and a shopping cart system may route the appropriate amount to each merchant, and each merchant may individually ship items to the user.

In various embodiments, a user may be associated with different carts that may be adjusted so that one or more items that are related or similar to an item in a certain cart may be added to that cart. For example, a user may have a home improvement cart, a toys cart, a vacation cart, a birthday present cart, etc. The user may select items that relate to home improvement and items that are toys from one merchant, and select items that relate to home improvement and items for a vacation at another merchant. A shopping cart system may place each item selected at the merchants in the relevant cart. Accordingly, the shopping cart system provides an improved shopping cart system by managing carts to make it easier for users to track items in shopping carts.

In one or more embodiments, a shopping cart system receives cart information for one or more items selected by a user, using a user device, on a first merchant website. The shopping cart system further receives cart information for one or more additional items selected by the user, using the user device, on a second merchant website. The shopping cart system may determine one or more groups of related items from among the one or more items from the first merchant and the one or more additional items from the second merchant. The shopping cart system may populate one or more shopping carts associated with the user based, at least in part, on the determined related items. For example, the shopping cart system may include all items that have not been purchased or removed in a universal shopping cart, include recently selected items to a recent items shopping cart, include each group of related items in a respective related items shopping cart, and/or include items selected at a specific merchant in a respective merchant shopping cart associated with the specific merchant.

In an embodiment, the shopping cart system may receive a checkout request for one of the shopping carts selected by the user, using the user device, that contains at least one item related to other items. The shopping cart system may provide to the user on the user device an option to check out the other related items in response to receiving the checkout request. The user may choose to add or not to add each of the other related items, further modify items in the selected shopping cart, and place an order of the items in the selected shopping cart. The shopping cart system may process the payment request and route the payment to the appropriate merchants. In another embodiment, the shopping cart system may remove items similar to the purchased items from the remaining shopping carts.

In certain embodiments, the shopping cart system may automatically check out one of the shopping carts after a predetermined amount of time, which may be set by the user. For example, after the predetermined amount of time since the last item was selected by the user, the shopping cart system may present a shopping cart and items contained in that shopping cart to the user on the user device. The presented shopping cart and items may be selected by the shopping cart system based on recent cart activity of the user.

In an example, a user may use the shopping cart system via a user device to buy winter clothes (e.g., a sweater, boots, a ski jacket, etc.), winter sporting goods (e.g., skis, goggles, etc.), and winter car equipment (e.g., an ice scrapper, snow tire chains, etc.) for a ski trip. The user may go to a clothing merchant website and select winter clothes. The user may then go to a sporting goods website and select winter sporting goods. The user may also select items unrelated to the ski trip. The user may then go to an automotive parts and accessories website and select winter car equipment. The user may have multiple shopping carts, including a universal cart containing all the selected items, a recent items shopping cart including recently selected items (e.g., the winter car equipment), related items shopping cart (e.g., a ski trip cart, a clothing cart, a sporting cart, an automotive-related cart, etc.), merchant shopping carts (e.g., a shopping cart for each of the clothing merchant website, the sporting goods website, and the automotive parts and accessories website), and other shopping carts. Some shopping carts may be created by the user, while others may be automatically generated by the shopping cart system. The user may be able to view the contents of each of the carts and/or switch between the carts. The currently active cart may be the recent items shopping cart containing the winter car equipment, and user may check out that cart. The shopping cart system may provide an option to add all of the ski trip related items contained in the ski trip cart to the checked-out cart, for example, by a pop up notification on the user device. The user may accept the addition of the ski trip related items. Accordingly, the shopping cart system advantageously presents items of interest to the user, and the user does not have to make separate purchases or look through his or her shopping cart for the items of interest.

Referring now to FIG. 1, a network-based system 100 for implementing online shopping cart management is illustrated according to an embodiment of the present disclosure. As shown, network-based system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of networked system 100 illustrated in FIG. 1 includes one or more user devices 120 (e.g., a mobile phone, a smartphone, a wearable device, a desktop personal computer, etc.) of one or more respective users 102, one or more merchant servers 140, and/or one or more service provider servers 180 (e.g., network server devices) in communication over a network 170. Network 170, in one embodiment, may be implemented as a single network or a combination of multiple networks. For example, in various embodiments, network 170 may include the Internet and/or one or more intranets, landline networks, wireless networks, and/or other appropriate types of communication networks. In another example, network 170 may comprise a wireless telecommunications network (e.g., cellular phone network) adapted to communicate with other communication networks, such as the Internet. As such, in various embodiments, user device 120, merchant server 140, and/or service provider server 180 may be associated with a particular link (e.g., a link, such as a URL (Uniform Resource Locator) to an IP (Internet Protocol) address).

User device 120, in various embodiments, may be utilized by user 102 to interact with merchant server 140 and/or service provider server 180 over network 170. User device 120 may be implemented using any appropriate combination of hardware and/or software configured for wired and/or wireless communication over network 170. In various embodiments, user devices 120 may include at least one of a smartphone, wireless cellular phone, satellite phone, tablet, laptop computer, notebook computer, hybrid/convertible computer, a desktop personal computer, a gaming device (e.g., a video game console), and/or other types of computing devices. In other embodiments, user devices 120 may include at least one of a wearable device, such as an activity tracker (e.g., a fitness tracker, a health tracker, etc.), smart watch, eyeglasses with appropriate computer hardware resources, and/or other types of wearable computing devices. User devices 120 may include a user interface module 122, one or more user identifiers 124, a browser module 126, other modules 128, a network interface module 130, and a storage module 132.

In various implementations, user 102 is able to input data and information into an input component (e.g., a touchscreen, a keyboard, a microphone, a video game console controller, etc.) of user device 120 to provide personal information, user interest information, user identification information, and other user data and/or information.

User interface module 122, in an embodiment, may be utilized by user 102 to access applications, to view data or information on a display of user device 120, and to conduct transactions (e.g., shopping, purchasing, bidding, etc.) with merchant server 140 and/or service provider server 180 over network 170. In one aspect, user 102 may login to an account associated with user 102, and purchase expenses may be directly and/or automatically debited from the account via user interface module 122. In one implementation, user interface module 122 includes a software program, such as a graphical user interface (GUI), executable by a processor that is configured to interface and communicate with merchant server 140 and/or service provider server 180 via network 170.

One or more user identifiers 124, in an embodiment, may be implemented as operating system registry entries, cookies associated with user interface module 122, identifiers associated with hardware of user device 120, or various other appropriate identifiers. User identifier 124 may include one or more attributes related to user 102, such as personal information related to user 102 (e.g., one or more of names, user names, passwords, photograph images, biometric IDs, addresses, phone numbers, a social security number, etc.), banking information, financial information, funding source information (e.g., one or more banking institutions, credit card issuers, user account numbers, security data and information, etc.), or other attributes. In various embodiments, credentials that include user identifier 124 may be transmitted with a user login request to merchant server 140 or service provider server 180 via network 170. Merchant server 140 or service provider server 180 may use the credentials to associate user 102 with a particular user account maintained by merchant server 140 or service provider server 180.

Browser module 126, in an embodiment, may be used to provide a user interface to permit user 102 to browse information available over network 170. For example, browser module 126 may be implemented as a web browser used to view information over the Internet. User 102 may use browser module 126 to access merchant websites via one or more merchant servers 140 associated with respective one or more merchants, view and select items to be placed in online shopping carts, access the online shopping carts, check out items in the shopping carts, and purchase checked-out items from the one or more merchants via payment provider server 180. Accordingly, user 102 may conduct transactions (e.g., purchase and provide payment for one or more items) with one or more merchant servers 140 via service provider server 180.

User device 120, in an embodiment, may include other modules 128 as may be desired in one or more embodiments of the present disclosure to provide additional features available to user 102. In one example, other modules 128 may include security modules for implementing client-side security features, programmatic client applications for interfacing with appropriate application programming interfaces (APIs) over network 170, and/or various other types of generally known programs and/or software modules. In still other examples, the other modules may interface with user interface module 122 for improved efficiency and convenience.

Network interface module 130, in an embodiment, communicates with other devices or servers over network 170. For example, user device 120 may communicate with merchant server 140 and/or service provider server 180 via network interface module 130 exchanging data and/or information (e.g., data packets) with a network interface module of respective servers over network 170.

Storage module 132, in an embodiment, may store data and information. Storage module 132 may contain one or more databases in which to store the data and/or information. User device 120 may locally store personal information, user account information, cart activity data, browsing activity data and/or other user data or information in a database on storage module 132.

In one aspect, when interfacing with user device 120, user 102 may elect and/or consent to provide personal information, user account information, cart activity data, browsing activity data and/or other user data or information to merchant server 140 and/or service provider server 180. User 102 may set or configure the user settings/configuration menu of user interface module 122 of user device 120. Through the user settings/configuration menu, user 102 may provide consent to share user data or information and the extent of shared user data or information. User device 120 may transmit shared user data or information dynamically by push synchronization, periodically, or each time an application associated with merchant server 140 and/or service provider server 180 is opened by user 102. In some embodiments, user 102 may be prompted for permission to release user data or information. Accordingly, user 102 may have exclusive authority to allow transmission of personal information, user account information, cart activity data, browsing activity data and/or other user data or information from user device 120 to merchant server 140 and/or service provider server 180.

One or more merchant servers 140, in various embodiments, may be maintained by one or more business entities (or in some cases, by a partner of a business entity that processes transactions on behalf of business entities). The business entities may maintain merchant websites (which may include, e.g., auction websites, marketplace websites, resource information websites, utility websites, real estate management websites, social networking websites, etc.) through which various items, such as goods and/or services, are offered for purchase and payment. In some embodiments, the business entities may need registration of user identification information as part of offering items to user 102 over network 170. As such, each of one or more merchant servers 140 may include a merchant database on a storage module 148 for identifying available items, which may be made available, at least in part, to user device 120 for viewing and purchase by user 102. In one or more embodiments, user 102 may complete a transaction such as purchasing the items via service provider server 180.

A merchant website, in an embodiment, may be maintained by a merchant and communicate (e.g., using merchant server 140) with service provider server 180 over network 170. For example, the merchant website may communicate with service provider server 180 in the course of various services offered by service provider server 180 to the merchant website, such as serving as a payment intermediary between customers of the merchant website and the merchant. The merchant website may use an application programming interface (API) that allows it to offer sale of items in which customers are allowed to make payment through service provider server 180, while user 102 may have an account with service provider server 180 that allows user 102 to use service provider server 180 for making payments to merchants that allow use of authentication, authorization, and payment services of service provider server 180 as a payment intermediary. The merchant website may also have an account with service provider server 180.

Each of merchant servers 140, in one embodiment, may include a marketplace module 142, which may be configured to provide data and/or information to user device 120 over network 170. For example, marketplace module 142 may transmit data and/or information relating to items offered for purchase to user device 120 to be presented on user device 120. User 102 may interact with marketplace module 142 through user device 120 to search and view the various items available for purchase in the merchant database on storage module 148.

Each of merchant servers 140, in one embodiment, may include a checkout module 144, which may implement a shopping cart and may be configured to facilitate online purchase transactions by user 102 of items identified by marketplace module 142. In this regard, checkout module 144 may be configured to accept payment information from user 102 and/or service provider server 180 over network 170.

Each of merchant servers 140, in one embodiment, may include at least one merchant identifier 146, which may be included as part of the one or more items made available for purchase so that, for example, particular items are associated with particular merchants. In one implementation, merchant identifier 146 may include one or more attributes and/or parameters related to the merchant, such as business and banking information. Merchant identifier 146 may include attributes related to merchant server 140, such as identification information (e.g., a serial number, a location address, GPS coordinates, a network identification number, etc.). In various embodiments, user 102 may conduct transactions (e.g., searching, selection, monitoring, purchasing, and/or providing payment for items) with each merchant server 140 via service provider server 180 over network 170.

Service provider server 180, in one embodiment, may be maintained by a service provider, such as an online service provider or a transaction processing entity that provides processing for financial transactions and/or information transactions between user 102 and one or more of merchant servers 140. Service provider server 180 may include a service module 182, a payment processing module 184, a shopping cart module 186, a cart management module 188, a network interface module 190, and/or a storage module 192. Any or all of the modules may be implemented as a subsystem of service provider server 180 including a circuit, a hardware component, a hardware subcomponent, and/or a variety of other subsystems known in the art. Furthermore, any or all of the modules may be preconfigured to perform their disclosed functionality, or may be configured by a processing system "on-the-fly" or as needed to perform their disclosed functionality. As such, any or all of the modules may include pre-configured and dedicated circuits and/or hardware components, or may be circuits and/or hardware components that are configured as needed.

For example, any or all of the modules may be provided via one or more circuits that include resistors, inductors, capacitors, voltage sources, current sources, switches, logic gates, registers, and/or a variety of other circuit elements known in the art. One or more of the circuit elements in a circuit may be configured to provide the circuit(s) that cause the modules to perform the functions described below. As such, in some embodiments, preconfigured and dedicated circuits may be implemented to perform the functions of the modules. In other embodiments, a processing system may execute instructions on a non-transitory, computer-readable medium to configure one or more circuits as needed to perform the functions of the modules.

Service module 182 may be included as a separate module provided in service provider server 180, or may be provided using instructions stored on a computer-readable medium that, when executed by a processing system in service provider server 180, configure service module 182 to interact with the user device 120 over network 170 to facilitate searching, selection, purchase, and/or payment of items by user 102 from one or more merchant servers 140, as well as provide any of the other functionality that is discussed herein. Payment processing module 184 may be included as a separate module provided in service provider server 180, or may be provided using instructions stored on a computer-readable medium that, when executed by a processing system in service provider server 180, configure payment processing module 184 to process purchases and/or payments for financial transactions between user 102 and each of merchant servers 140, as well as provide any of the other functionality that is discussed herein. In one implementation, payment processing module 184 assists with resolving financial transactions through validation, delivery, and settlement. As such, service module 182, in conjunction with the payment processing module 184, settles indebtedness between user 102 and each of merchant servers 140, wherein accounts may be directly and/or automatically debited and/or credited of monetary funds in a manner as accepted by the banking industry.

Shopping cart module 186 may be included as a separate module provided in service provider server 180, or may be provided using instructions stored on a computer-readable medium that, when executed by a processing system in service provider server 180, configure shopping cart module 186 to access one or more lists of items selected by user 102 on one or more merchant websites, determine related items, populate one or more shopping carts, receive a checkout request for a shopping cart containing at least one of the related items, and/or provide an option to check out or remove another one of the related items, as well as provide any of the other functionality that is discussed herein. Cart management module 188 may be a part of shopping cart module 186, may be included as a separate module provided in service provider server 180, or may be provided using instructions stored on a computer-readable medium that, when executed by a processing system in service provider server 180, configure cart management module 188 to determine related items by determining, for example, which items relate to the same purpose and/or activity, which items belong to a category of items, which items are of the same type, which items are frequently bought together, and/or other relationships between items, generate and/or populate related item shopping carts based on determining of the related items, monitor shopping cart activity, and/or add or remove items from the shopping carts based on shopping cart activity, as well as provide any of the other functionality that is discussed herein.

Network interface module 190 is communicatively coupled to network 170, and may be communicatively coupled to any or all of modules 182, 184, 186, and/or 188, any of which may be coupled to a storage module 192. Network interface module 190 may be included as a separate module provided in service provider server 180, or may include communications hardware (e.g., antennas) and instructions stored on a computer-readable medium that, when executed by a processing system in service provider server 180, configure network interface module 190 to operate the communications hardware to send and receive data and/or information over network 170, as well as provide any of the other functionality that is discussed herein.

Storage module 192 may include one or more databases, such as a cart database 194 and/or an account database 196. Service provider server 180, in one embodiment, may be configured to maintain shopping cart information for one or more users 102 in cart database 194 on storage module 192. For example, shopping cart information of each user 102 may include shopping cart identifiers for one or more shopping carts associated with each user 102, contents of each of the shopping carts, shopping cart activity (e.g., which items were added and when those items were added, which items were removed and when those items were removed, which items were purchased and when those items were purchased, etc.), and/or other shopping cart-related information. The shopping cart information of each user 102 may be associated with a user account of respective user 102 in account database 196.

Service provider server 180, in one embodiment, may be configured to maintain one or more user accounts and merchant accounts in account database 196 on storage module 192, each of which may include account information associated with one or more individual users (e.g., user 102) and merchants. For example, the account information may include private financial information of user 102 and merchants (e.g., one or more merchants associated with merchant servers 140), such as one or more account numbers, passwords, credit card information, banking information, or other types of financial information, which may be used to facilitate financial transactions between user 102, and one or more merchants associated with merchant servers 140. The account information may also include personal information, such as one or more contact information (e.g., phone number, address, email, etc.) and other account identifications (IDs) of user 102 that are maintained by third parties (e.g., user names or account numbers). In various aspects, the methods and systems described herein may be modified to accommodate users and/or merchants that may or may not be associated with at least one existing user account and/or merchant account, respectively.

In one implementation, user 102 may have identity attributes stored with service provider server 180, and user 102 may have credentials to authenticate or verify identity with service provider server 180. User attributes may include personal information, banking information and/or funding source information. In various aspects, the user attributes may be passed to service provider server 180 as part of a login, search, selection, purchase, and/or payment request, and the user attributes may be utilized by service provider server 180 to associate user 102 with one or more particular user accounts maintained by service provider server 180.

While shopping cart module 186 and cart management module 188 have been illustrated as located in service provider server 180, one of skill in the art will recognize that it may be provided, at least in part, in user device 120 and/or merchant server 140. For example, shopping cart module 186 and/or cart management module 188 may be implemented, at least in part, by a plug-in application, widget application, or via browser module 126 of user device 120. In another example, shopping cart module 186 and/or cart management module 188 may be implemented, at least in part, by checkout module 144 of merchant server 140.

While storage module 192 has been illustrated as located in service provider server 180, one of skill in the art will recognize that it may include multiple storage modules and may be connected to other modules through network 170 without departing from the scope of the present disclosure. Other modules discussed herein but not illustrated in FIG. 1 may be provided as separate modules on service provider server 180, or using instructions stored on a computer-readable medium similarly as discussed above.

Figure 2:
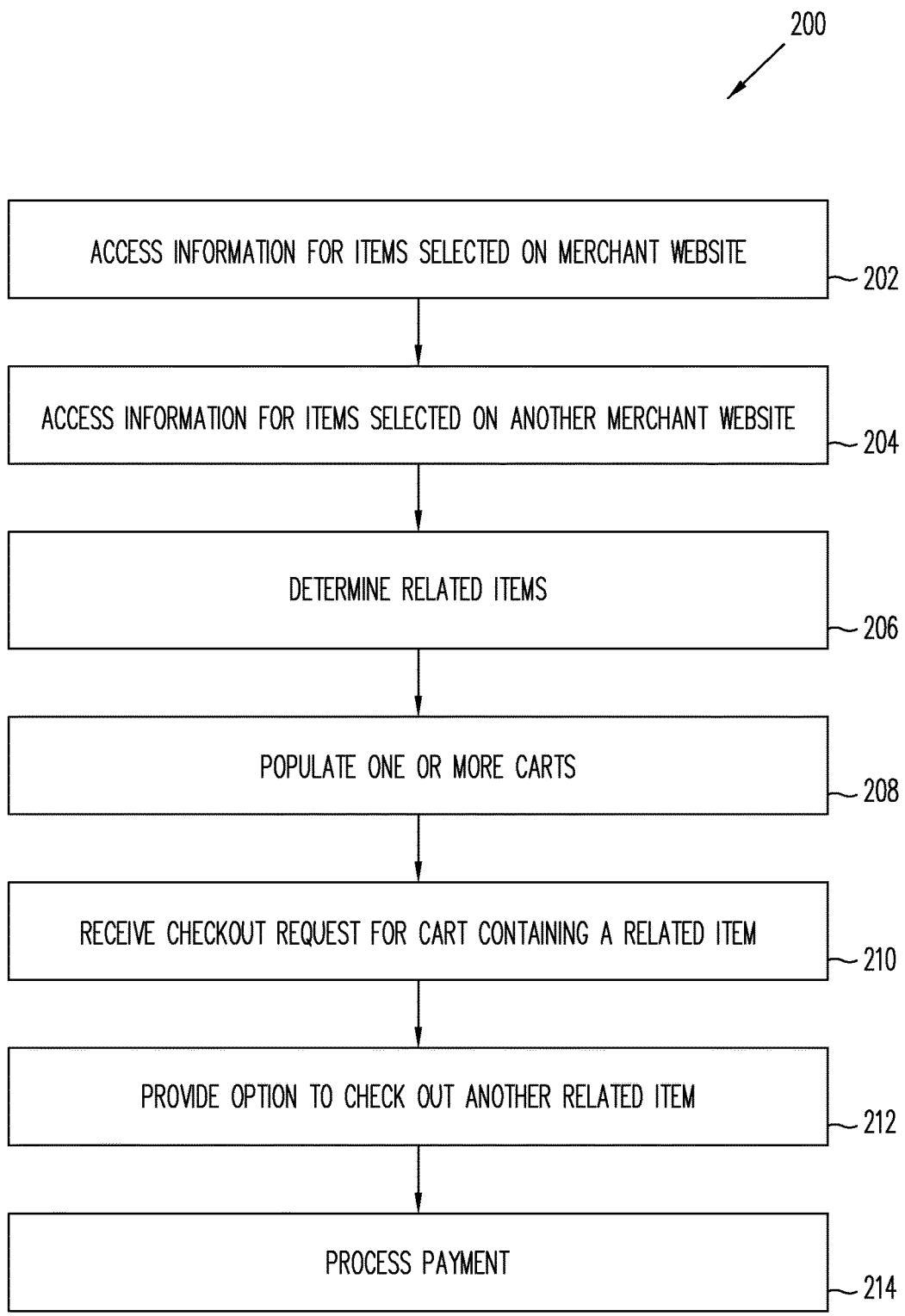
FIG. 2 is a flowchart illustrating a method for online shopping cart management according to an embodiment of the present disclosure.

Referring now to FIG. 2, a flowchart of a method for online shopping cart management is illustrated according to an embodiment of the present disclosure.

At block 202, service provider server 180 accesses cart information for one or more items selected by user 102 on a first merchant website. In various embodiments, user 102 may use browser module 126 of user device 120 to select one or more items offered for purchase on a first merchant website by, for example, placing the items inside, or adding the items to, a shopping cart. The shopping cart may accumulate a list of items selected by user 102. Service provider server 180 (e.g., using shopping cart module 186) may access and/or receive cart information indicating the one or more items selected by user 102 on the first merchant website. In certain embodiments, cart information may include a list of items selected by user 102 on the first merchant website. In further embodiments, the cart information may include, for example, a shopping cart identifier, items contained in the shopping cart, which items were added and when those items were added, which items were removed and when those items were removed, and/or other shopping cart-related information.

In an embodiment, service provider server 180 (e.g., using shopping cart module 186) may access and/or receive cart information directly from user device 120 over network 170. For example, a merchant associated with the merchant website may implement a shopping cart system that is provided by service provider and hosted by service provider server 180.

In another embodiment, service provider server 180 (e.g., using shopping cart module 186) may access and/or receive cart information from merchant server 140 over network 170. For example, merchant server 140 may determine cart information based on user 102 selecting one or more items via browser module 126 on the merchant website. Merchant server 140 may then transmit the cart information to service provider server 180 over network 170.

In a further embodiment, service provider server 180 (e.g., using shopping cart module 186) may access cart information on storage module 192 of service provider server 180. For example, service provider server 180 may store cart information received from user device 120 or from merchant server 140 in cart database 194 of storage module 192. Service provider server 180 may then access the cart information in response to, for example, user 102 logging on to an account with merchant website or an account maintained by service provider server 180.

At block 204, service provider server 180 accesses information for items selected on a second merchant website. In various embodiments, user 102 may use browser module 126 of user device 120 select items offered for purchase on a second merchant website by, for example, placing the items inside, or adding the items to, a shopping cart. Service provider server 180 (e.g., using shopping cart module 186) may access and/or receive additional cart information indicating items selected by user 102 on the second merchant website. The first merchant website and the second merchant website may belong to different domains and may be associated with different merchants. Alternatively, the first merchant website and the second merchant website may be the same merchant website associated with the same merchant but accessed at different times. In certain embodiments, the additional cart information may include a second list of items selected by user 102 on the second merchant website.

In some embodiments, the shopping cart may be the same shopping cart described at block 202. Accordingly, the shopping cart may be associated with user 102 and/or service provider server 180, and not be specific for each merchant website. In other embodiments, there may be shopping carts that are specific to each merchant website, but user 102 may have other shopping carts that are not associated with the specific merchants. User 102 may be able to view and switch between the various shopping carts, and/or service provider server 180 may provide the relevant shopping cart based on the circumstances (e.g., based on cart activity, such as what kinds of items have been recently added to shopping carts).

At block 206, service provider server 180 determines related items from the one or more items selected on the first merchant website and the one or more items selected on the other merchant website to populate one or more shopping carts. In various embodiments, service provider server 180 (e.g., using shopping cart module 186) may determine related items, such as various groups of related items, from among the items from the first merchant website and the items from the second merchant website.

In an embodiment, service provider server 180 may determine that certain items relate to the same purpose and/or activity. For example the related items may be items to be used for home improvement, items to be used during a vacation, items for gifts (e.g., birthday gifts), items for a sport (e.g., equipment and clothing for jogging, skiing, football, baseball, basketball, etc.), or items for another purpose or activity.

In another embodiment, service provider server 180 may determine that certain items are items selected at the same merchant website. For example, a group of related items may be items selected by user 102 on the first merchant website, and another group of related items may be items selected by user on the second merchant website.

In a further embodiment, service provider server 180 may determine that certain items are similar items. The related items may be items belonging to the same category of items, or items of the same type. The category and/or type may range from broad/general to narrow/specific. For example, the related items may be two or more toys (based on a broad category or type) or two or more water guns (based on a narrow category or type).

In certain embodiments, service provider server 180 may determine that certain items are frequently purchased together. The related items may be frequently purchased together items based on cart activity information of many users 102 and/or based on the functioning of the items. For example, service provider server 180 may determine that a lamp and a light bulb are related items based on cart activity information indicating users 102 typically purchase lamps together with light bulbs.

Other examples of related items may include items having a same name, items having a same brand, items with related semantic characteristics, and/or items that are related in other ways.

At block 208, service provider server 180 populates one or more shopping carts based, at least in part, on the determination of the related items. In various embodiments, service provider server 180 (e.g., using shopping cart module 186) may populate one or more shopping carts that may include existing carts and/or newly generated carts using the related items information from block 206. For example, the one or more carts may include a recent items shopping cart containing recently selected items, a universal shopping cart containing all selected items that have not been purchased or removed by user 102, a first merchant shopping cart containing items selected on the first merchant website, a second merchant shopping cart containing items selected on the second merchant website, one or more related item shopping carts containing items relating to the same purpose or activity, one or more similar item shopping carts containing items of the same type or belonging to the same category, one or more user created and/or selected carts, and/or other shopping carts.

At block 210, service provider server 180 receives a checkout request of one of the shopping carts that contains at least one of the related items. In an embodiment, user 102 may use browser module 126 of user device 120 to check out (e.g., by clicking on a shopping cart button), and a default shopping cart may be selected for checkout and user 102 may view items in the default shopping cart. For example, the default shopping cart may be the recent items shopping cart or the merchant shopping cart corresponding to the merchant website that user 102 is viewing at the time.

In another embodiment, service provider server 180 (e.g., using shopping cart module 186) may select the shopping chart to check out based, at least in part, on recent shopping cart activity. Service provider server 180 may access shopping cart activity from cart database 194 on storage module 192 of service provider server 180. Service provider server 180 may determine which shopping cart to select to check out based on which cart or which items user 102 is likely most interested in based on the recent shopping cart activity. For example, service provider server 180 may determine that a last item selected by user 102 is one of the related items determined at step 206, and select the related items shopping cart that contains that related item. In another example, service provider server 180 may access shopping cart activity and select the recent items shopping cart, or the merchant shopping cart for the merchant website that user 102 is currently viewing based on, for example, purchase history of user 102, favorite merchant store of user 102, etc.

In a further embodiment, user 102 may use browser module 126 of user device 120 to select one of the shopping carts and view contents of the selected shopping cart (e.g., by clicking on a shopping cart button). User may then check out the selected shopping cart (e.g., by clicking on a checkout button) that includes at least one of the related items determined at block 206. Service provider server 180 (e.g., using shopping cart module 186) may receive a checkout request for the selected shopping cart from user device 120 and/or merchant server 140.

At block 212, service provider server 180 provides user 102 with an option to check out one or more other related items. In an embodiment, service provider server 180 (e.g., using shopping cart module 186) provides user 102 with an option to check out one or more other related items by transmitting a notification to user device 120. User device 120 may present on browser module 126 the notification that inquires whether user 102 would like to check out one or more other related items and includes a link or a button to add and/or select the other related items to the selected shopping cart.

In another embodiment, service provider server 180 (e.g., using shopping cart module 186) provides user 102 with an option to check out one or more other related items by automatically adding one or more other related items to the selected shopping cart and providing an option to accept or decline the addition. For example, the selected shopping cart may highlight the automatically added items so that user 102 is alerted to the addition.

Accordingly, when user 102 indicates that he or she intends to purchase one of the related items (e.g., a lamp), service provider server 180 advantageously suggests purchasing one or more other related items (e.g., a light bulb) or automatically adds them, so that user 102 may avoid forgetting to add relevant items. Further, user 102 may conveniently rely on service provider server 180 to automatically add relevant items instead of searching through other shopping carts to find the relevant items.

At block 214, service provider server 180 processes payment. In various embodiments, user 102 may modify the items in the checked out shopping cart and place the order (e.g., by clicking on a place order button). Service provider server 180 (e.g., using payment processing module 184) may process a payment request in response to the user placing an order for the items in the selected shopping cart, which may include at least one of the related items.

Figure 3:
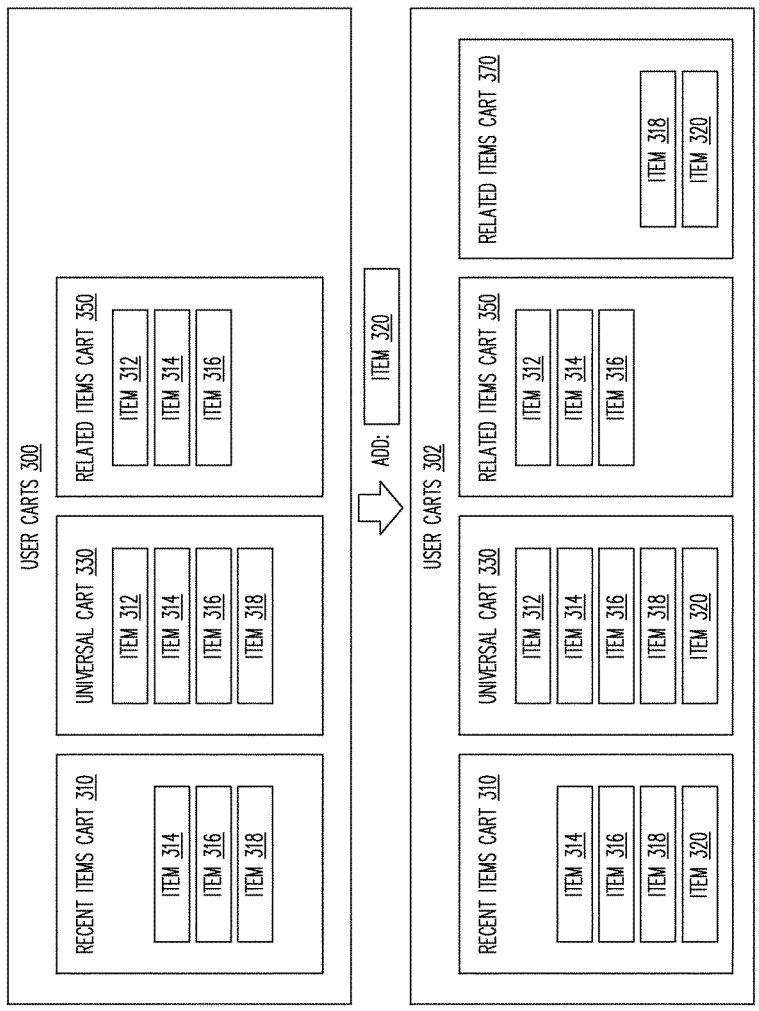
FIG. 3 is a block diagram illustrating a representation of shopping carts of a user before and after adding an item according to an embodiment of the present disclosure.

Referring now to FIG. 3, a block diagram of a representation of shopping carts 300 before user 102 adds an item and shopping carts 302 after user 102 adds the item is illustrated according to an embodiment of the present disclosure.

Before user 102 adds an item, such as item 320, user 102 may have a recent items shopping cart 310, a universal shopping cart 330, and a related items shopping cart 350. Recent items shopping cart 310 may include items, such as items 314, 316, and 318, that were recently selected by user 102 or selected during a single login session at a merchant website. Universal shopping cart 330 may include all items, such as items 312, 314, 316, and 318, that were added but have not been purchased or removed. Related items shopping cart 350 may include items, such as items 312, 314, and 316, that are related because the items relate to the same purpose or activity, belong to the same category of items, are of the same type, etc.

In response to user 102 adding item 320 to the shopping carts, service provider server 180 adds item 320 to recent items shopping cart 310 and universal shopping cart 330. Service provider server 180 determines that item 320 is not related to items 312, 314, and 316 of related items shopping cart 350, and does not add item 320 to related items shopping cart 350. Further, service provider server 180 determines that item 320 is related to item 318. Service provider server 180 generates a related items shopping cart 370 for related items 318 and 320, and adds items 318 and 320 to related items shopping cart 370.

Figure 4:
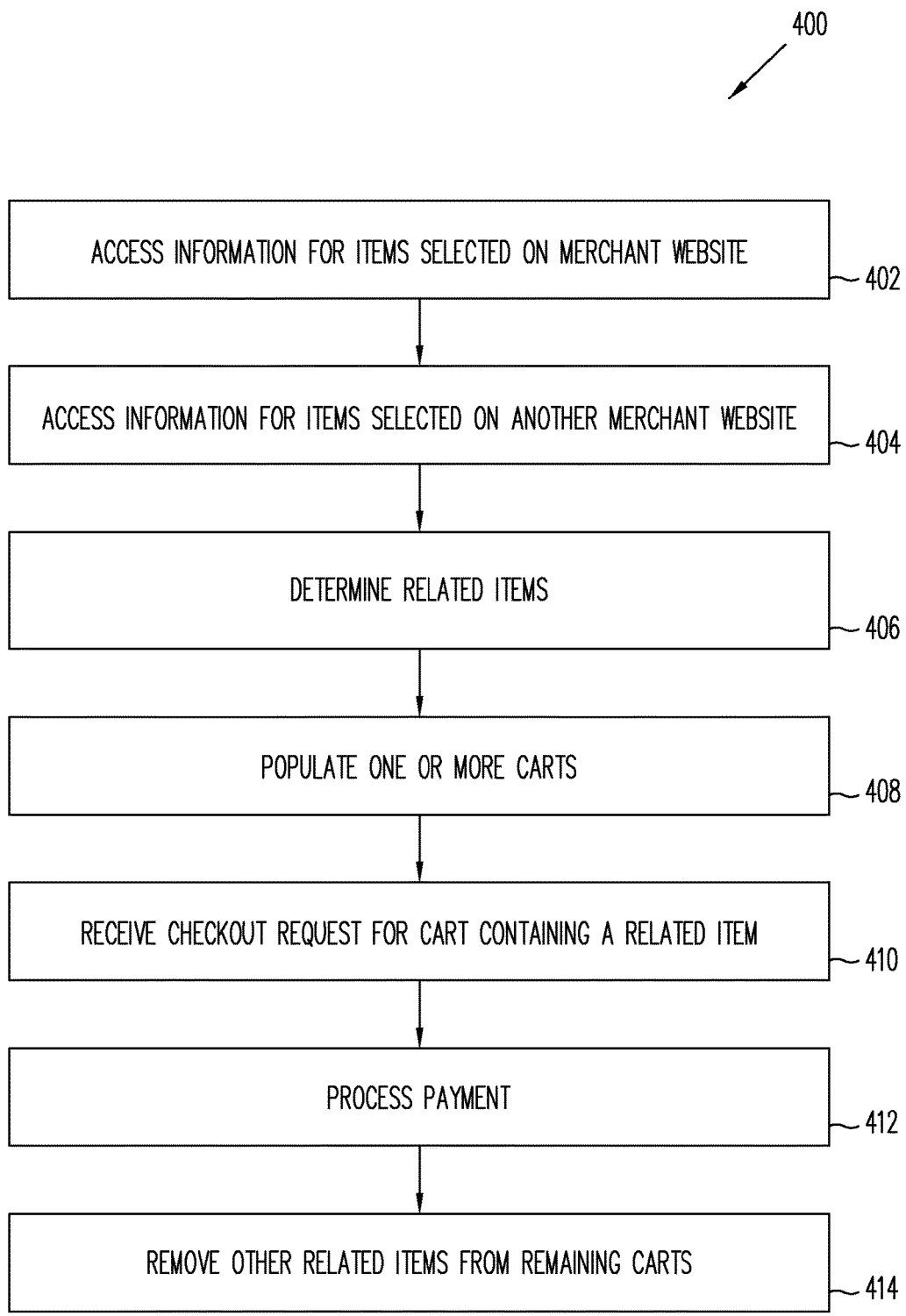
FIG. 4 is a flowchart illustrating a method for online shopping cart management that includes removing an item according to an embodiment of the present disclosure.

Referring now to FIG. 4, a flowchart of a method for online shopping cart management that includes removing an item is illustrated according to an embodiment of the present disclosure.

At block 402, service provider server 180 accesses information for items selected on a first merchant website, as described at block 202 in FIG. 2.

At block 404, service provider server 180 accesses information for items selected on a second merchant website, as described at block 204 in FIG. 2.

At block 406, service provider server 180 determines related items from the items selected on the first merchant website and the items selected on the second merchant website.

In various embodiments, service provider server 180 may determine that certain items are of a same type. In particular, the related items may be items that are identical (e.g., identical items selected on different merchant websites), items that belong to the same specific category or are of the same specific item type (e.g., almost identical items produced by different manufacturers), or otherwise similar items, such that users 102 typically only purchase one of the items (or users 102 typically purchase a certain number of the items that is otherwise predictable). For example, user 102 may select an item that is nearly identical to an item already in the shopping carts because user 102 found a better deal, user 102 is comparing the items, or user 102 at the time could not decide which item to purchase. Service provider server 180 may determine that users 102 typically only purchases one of the similar items based on how similar the items are, cart activity information of many users 102, how many items users 102 typically have, etc. For example, service provider server 180 may determine that two mobile phones in a shopping cart are similar items such that if one is purchased, the other is to be removed from the shopping cart based on cart activity information of many users 102 indicating users 102 typically only purchase one mobile phone and/or other information indicating, for example, most users 102 only have one mobile phone.

In addition, service provider server 180 may determine related items as described at block 206 in FIG. 2.

At block 408, service provider server 180 populates one or more carts based, at least in part, on the determination of the related items, as described at block 208 in FIG. 2.

At block 410, service provider server 180 receives a checkout request of one of the shopping carts that contains at least one of the related items, as described at block 210 in FIG. 2.

At block 412, service provider server 180 processes payment, as described at block 214 in FIG. 2.

At block 414, service provider server 180 removes one or more other related items from the remaining shopping carts based, at least in part, on the determination of the related items. In various embodiments, service provider server 180 may remove one or more other related items based on determining that the items are similar items for which users 102 typically only purchases one of the items (or users 102 typically purchase a certain number of the items that is otherwise predictable and user 102 has purchased the certain number).

In an embodiment, service provider server 180 (e.g., using shopping cart module 186) removes one or more other related items from the remaining shopping carts by presenting on the user device 120 a notification inquiring whether user 102 would like to remove the other one of the related items and including a link to remove the other one of the related items to the selected one of the one or more carts.

In another embodiment, service provider server 180 (e.g., using shopping cart module 186) removes one or more other related items from the remaining shopping carts by automatically deleting the other one of the related items from the one or more shopping carts. Service provider server 180 may further provide an option to accept or decline the removal. For example, the remaining shopping carts, when viewed by user 102, may show the automatically removed items as greyed out or highlighted so that user 102 is alerted to the removal and may add them back in to the shopping carts.

Figure 5:
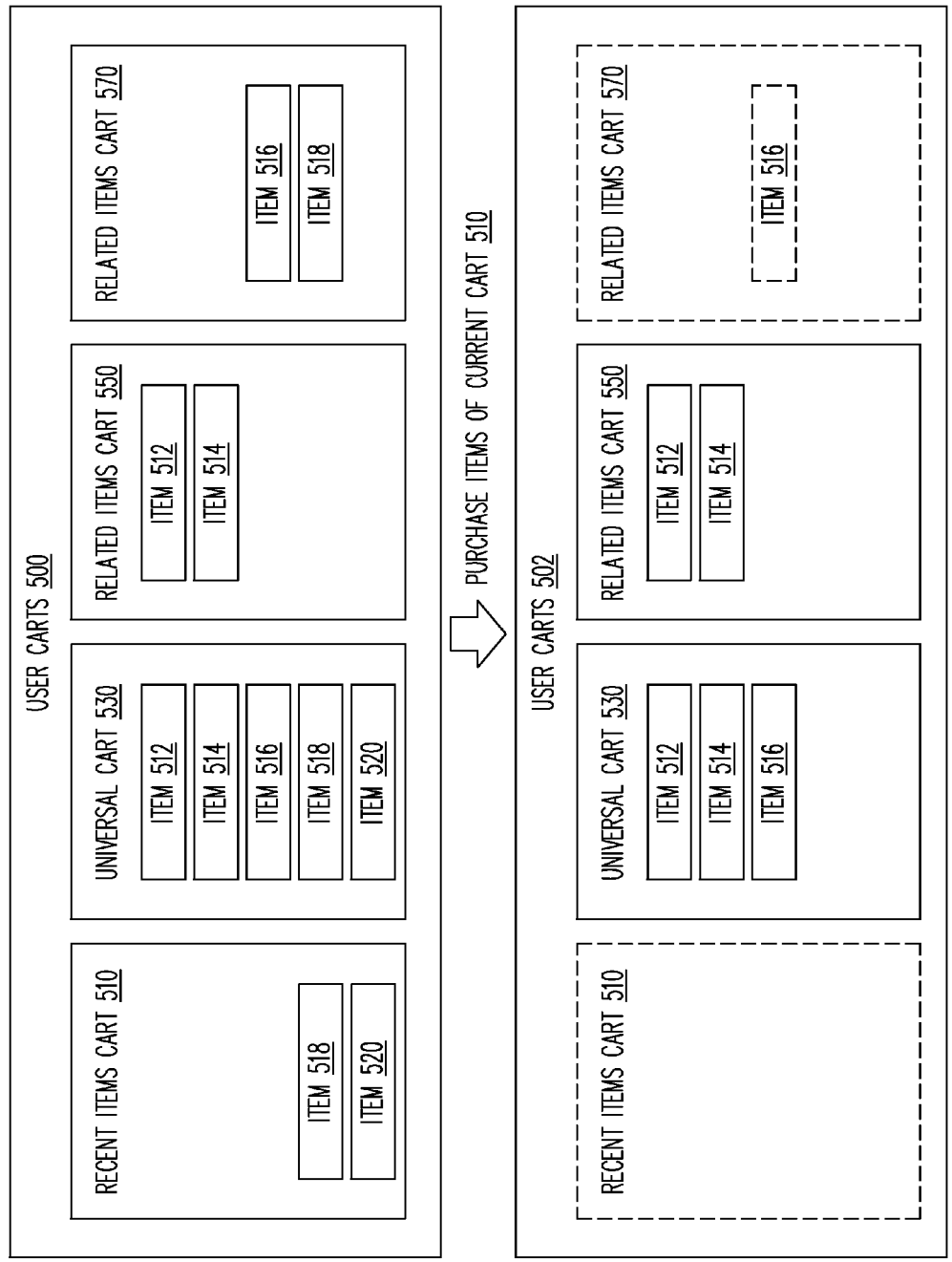
FIG. 5 is a block diagram illustrating a representation of shopping carts of a user before and after purchasing items contained in one of the shopping carts according to an embodiment of the present disclosure.

Referring now to FIG. 5, a block diagram of a representation of shopping carts 500 of before user 102 purchases items contained in one of the shopping carts and shopping carts 502 after user 102 purchases items contained in one of the shopping carts is illustrated according to an embodiment of the present disclosure.

Before user 102 checks out a shopping cart, such as a recent items shopping cart 510, user 102 may have recent items shopping cart 510, a universal shopping cart 530, a related items shopping cart 550, and a related items shopping cart 570. Recent items shopping cart 510 may include items, such as items 518 and 520, that were recently selected by user 102 or selected during a single login session at a merchant website. Universal shopping cart 330 may include all items, such as items 512, 514, 516, 518, and 520, that were added but have not been purchased or removed. Related items shopping cart 550 may include items, such as items 512 and 514, that are related because the items relate to the same purpose or activity, belong to the same category of items, are of the same type, etc. Related items shopping cart 570 may include items, such as items 516 and 518, that are related because the items relate to the same purpose or activity, belong to the same category of items, are of the same type, etc.

In response to user 102 checking out current cart 510 and purchasing items 518 and 520, service provider server 180 empties recent items shopping cart 510, and removes items 518 and 520 from the remaining carts. Accordingly, items 518 and 520 are removed from universal shopping cart 530 and item 518 is removed from related items shopping cart 570. Further, service provider server 180 determines that item 516 is no longer related to another item because item 518 was removed. Service provider server 180 may also remove item 516 from related items shopping cart 570, and delete related items shopping cart 570.

Figure 6:
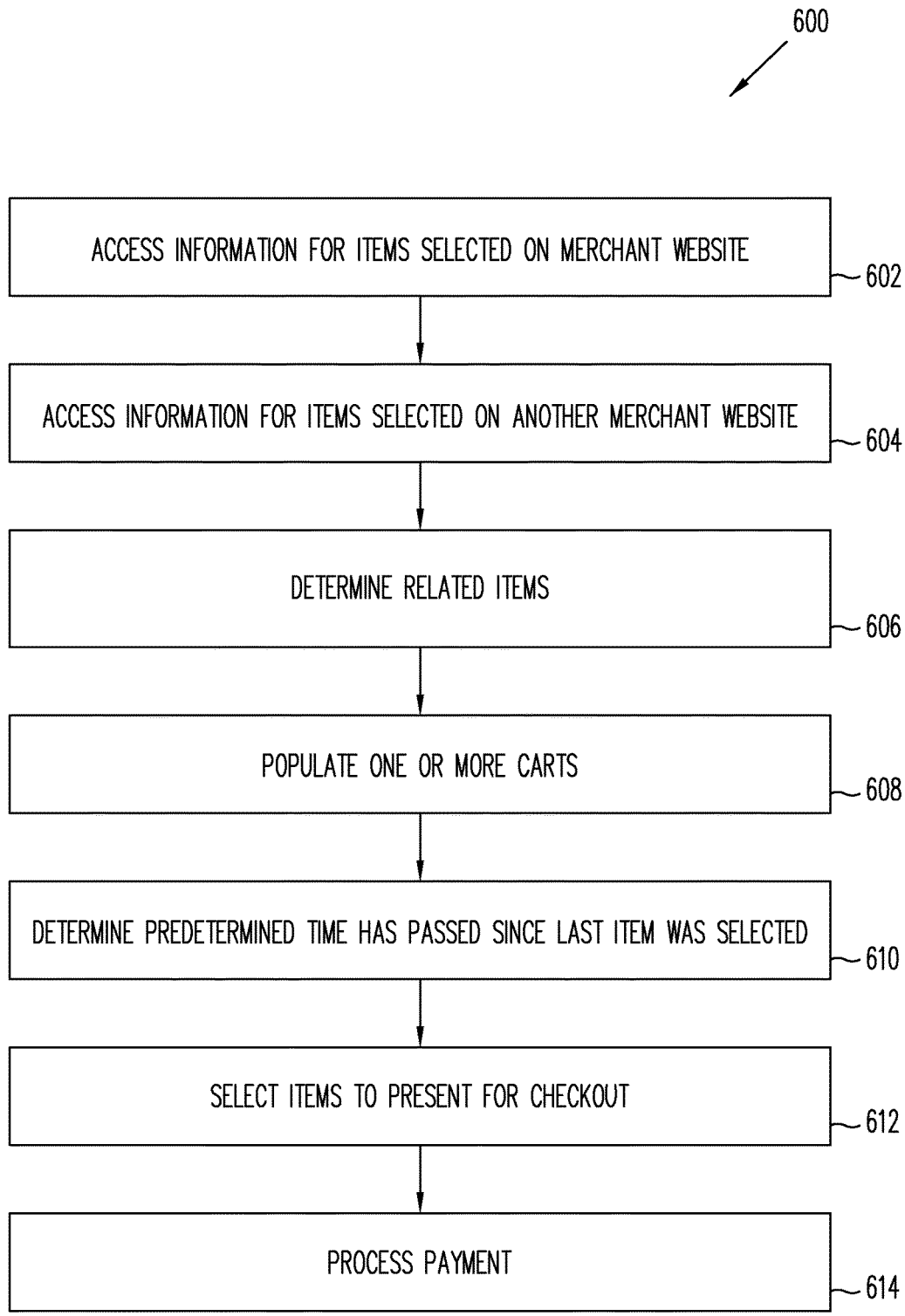
FIG. 6 is a flowchart illustrating a method for online shopping cart management that includes automatic checkout according to an embodiment of the present disclosure.

Referring now to FIG. 6, a flowchart of a method for online shopping cart management that includes automatic checkout is illustrated according to an embodiment of the present disclosure.

At block 602, service provider server 180 accesses information for items selected on a first merchant website, as described at block 202 in FIG. 2.

At block 604, service provider server 180 accesses information for items selected on a second merchant website, as described at block 204 in FIG. 2.

At block 606, service provider server 180 determines related items from the items selected on the first merchant website and the items selected on the second merchant website, as described at block 206 in FIG. 2.

At block 608, service provider server 180 populates one or more carts based, at least in part, on the determination of the related items, as described at block 208 in FIG. 2.

At block 610, service provider server 180 determines that a predetermined time has passed since the last item was selected. In an embodiment, user 102 may set the predetermined time (e.g., 30 min). Alternatively, service provider server 180 may set a predetermined time, which may be the same for all users 102 or personalized based on the cart activity information of each user 102.

In an example, service provider server 180 (e.g., using shopping cart module 186) may access cart information that includes a time each of the items selected by user was added to determine a time passed since the last item was selected by user 102 to add to the one or more shopping carts. In another example, service provider server 180 (e.g., using shopping cart module 186) may restart a timer each time user 102 selects an item to add to the one or more shopping carts.

At block 612, service provider server 180 selects items to present to user 102 on user device 120 for checkout based, at least in part, on recent shopping cart activity. In various embodiments, service provider server 180 (e.g., using shopping cart module 186) may access shopping cart activity from cart database 194 on storage module 192 of service provider server.

In an embodiment, service provider server 180 (e.g., using shopping cart module 186) may determine that the last item selected by user 102 is one of the related items determined at step 606, and select the related items shopping cart that contains that related item.

In another embodiment, service provider server 180 (e.g., using shopping cart module 186) selects the recent items shopping cart, or the merchant shopping cart for the most recently visited merchant website.

In a further embodiment, service provider server 180 (e.g., using shopping cart module 186) may provide user 102 an option to select one of the shopping carts of user 102 by, for example, presenting a list of the shopping carts on user device 120 and links or buttons for selecting each shopping cart.

In certain embodiments, service provider server 180 (e.g., using shopping cart module 186) may remove an item from the selected shopping cart in response to determining that user 102 purchased a similar item since that item was selected by the user based on recent shopping cart activity of user 102.

At block 614, service provider server 180 processes payment, as described at block 214 in FIG. 2.

Referring now to FIG. 7, an embodiment of a computer system 700 suitable for implementing, for example, the user device, merchant server, and service provider server is illustrated according to an embodiment of the present disclosure. It should be appreciated that other devices utilized by users, service providers, and/or merchants in the system discussed above may be implemented as computer system 700 in a manner as follows.

In accordance with various embodiments of the present disclosure, computer system 700, such as a computer and/or a network server, includes a bus 702 or other communication mechanism for communicating information, which interconnects subsystems and components, such as a processing component 704 (e.g., processor, micro-controller, digital signal processor (DSP), etc.), a system memory component 706 (e.g., RAM), a static storage component 708 (e.g., ROM), a disk drive component 710 (e.g., magnetic or optical), a network interface component 712 (e.g., modem or Ethernet card), a display component 714 (e.g., light-emitting diode (LED) display component, organic light-emitting diode (OLED) component, liquid-crystal (LCD) display component, plasma display panel (PDP), cathode ray tube (CRT) display component, or other display component), an input component 716 (e.g., keyboard, keypad, virtual keyboard, touchscreen, etc.), a cursor control component 718 (e.g., mouse, pointer, trackball, etc.), and/or a location determination component 720 (e.g., a Global Positioning System (GPS) device as illustrated, a cell tower triangulation device, and/or a variety of other location determination devices known in the art). In one implementation, disk drive component 710 may include a database having one or more disk drive components.

In accordance with various embodiments of the present disclosure, computer system 700 performs specific operations by processor 704 executing one or more sequences of instructions contained in system memory component 706, such as described herein with respect to the user device, merchant server, and service provider server. Such instructions may be read into system memory component 706 from another computer readable medium, such as static storage component 708 or disk drive component 710. In other embodiments, hard-wired circuitry may be used in place of, or in combination with, software instructions to implement the present disclosure.

Logic may be encoded in a computer readable medium, which may refer to any medium that participates in providing instructions to processor 704 for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component 710, volatile media includes dynamic memory, such as system memory component 706, and transmission media includes coaxial cables, copper wire, and fiber optics, including wires that comprise bus 702. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by a communication link 722 to a network 724 (e.g., such as a LAN, WLAN, PTSN, and/or various other wired or wireless networks, including telecommunications, mobile, and cellular phone networks), such as network 170, may perform instruction sequences to practice the present disclosure in coordination with one another.

Computer system 700 may transmit and receive messages, data, information and instructions, including one or more programs (i.e., application code) through communication link 722 and network interface component 712. Network interface component 712 may include an antenna, either separate or integrated, to enable transmission and reception via communication link 722. Received program code may be executed by processor 704 as received and/or stored in disk drive component 710 or some other non-volatile storage component for execution.

In view of the present disclosure, it will be appreciated that various devices, systems, and methods have been described according to one or more embodiments for online shopping cart management.

Although various components and steps have been described herein as being associated with user device 120, merchant server 140, and service provider server 180 of FIG. 1, it is contemplated that the various aspects of such devices and servers illustrated in FIG. 1 may be distributed among a plurality of servers, devices, and/or other entities.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, mobile device, server, and other devices described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
in response to detecting a user selecting a first set of items from a first merchant website via a browser application of a user device, adding the first set of items to a universal shopping cart that is independent from the first merchant website;
in response to detecting the user selecting a second set of items from a second merchant website via the browser application, adding the second set of items to the universal shopping cart, wherein the universal shopping cart is independent from the second merchant website;
determining related items from items in the first list set and the second set list;
in response to determining the related items, populating a related items shopping cart that is separate from the universal shopping cart with the determined related items;
receiving a checkout request for a selected one of the related items;
automatically removing another one of the related items different from the selected one of the related items from both of the universal shopping cart and the related items shopping cart in response to receiving the checkout request;
processing a payment request for an order including the selected one of the related items in response to the user placing the order.

2. The system of claim 1, wherein the operations further comprise:
generating a first merchant shopping cart and populating the first merchant shopping cart with items on the first set; and
generating a second merchant shopping cart and populating the second merchant shopping cart with items on the second set.

3. The system of claim 1, wherein determining the related items comprises determining items from the first set and the second set that are related to a same purpose or activity.

4. The system of claim 1, wherein the operations further comprise presenting on the user device a notification inquiring whether the user would like to keep the other one of the related items in at least one of the universal shopping cart or the related items shopping cart before removing the other one of the related items from the universal shopping cart and the related items shopping cart.

5. The system of claim 1, wherein the related items comprise items of a same type.

6. The system of claim 1, wherein the operations further comprise accentuating a graphical representation of the other one of the related items in at least one of the universal shopping cart or the related items shopping cart before removing the other one of the related items from the universal shopping cart and the related items shopping cart.

7. The system of claim 1, wherein the operations further comprise providing an option on the user device for purchasing the other one of the related items before removing the other one of the related items from the universal shopping cart and the related items shopping cart.

8. The system of claim 1, wherein the determining of the related items is based on descriptions of the related items from the first merchant site and/or the second merchant site.

9. The system of claim 1, wherein the determining of the related items is further based on a purchase history of the user.

10. A method comprising:
in response to detecting a user selecting a first set of items from a first merchant website via a browser application of a user device, adding, by one or more hardware processors, the first set of items to a universal shopping cart that is independent from the first merchant website;
in response to detecting the user selecting a second set of items from a second merchant website via the browser application, adding, by one or more hardware processors, the second set of items to the universal shopping cart, wherein the universal shopping cart is independent from the second merchant website;
determining, by the one or more hardware processors, related items from items in the first list set and the second set list;
in response to determining the related items, populating, by the one or more hardware processors, a related items shopping cart that is separate from the universal shopping cart with the determined related items;
receiving, by the one or more hardware processors, a checkout request for a selected one of the related items;
automatically removing, by the one or more hardware processors, another one of the related items different from the selected one of the related items from both of the universal shopping cart and the related items shopping cart in response to receiving the checkout request;
processing, by the one or more hardware processors a payment request for an order including the selected one of the related items in response to the user placing the order.

11. The method of claim 10, further comprising:
generating, by the one or more hardware processors, a first merchant shopping cart and populating the first merchant shopping cart with the first set of items; and
generating, by the one or more hardware processors, a second merchant shopping cart and populating the second merchant shopping cart with the second set of items.

12. The method of claim 10, wherein determining the related items comprise determining items from the first set and the second set that are related to a same purpose or activity.

13. The method of claim 10,
further comprising presenting on the user device a notification inquiring whether the user would like to keep the other one of the related items in at least one of the universal shopping cart or the related items shopping cart before removing the other one of the related items from the universal shopping cart and the related items shopping cart.

14. The method of claim 10, wherein the related items comprise items of a same type.

15. The method of claim 10, wherein the first merchant website and the second merchant website belong to different domains and are associated with different merchants.

16. The method of claim 10, further comprising providing on the user device an option for the user to purchase the other one of the related items before removing the other one of the related items from the universal shopping cart and the related items shopping cart.

17. A non-transitory computer readable medium comprising a plurality of machine-readable instruction which when executed by the one or more processors of a server are adapted to cause the server to perform operations comprising:
in response to detecting a user selecting a first set of items from a first merchant website via a browser application of a user device, adding the first set of items to a universal shopping cart that is independent from the first merchant website;
in response to detecting the user selecting a second set of items from a second merchant website via the browser application, adding the second set of items to the universal shopping cart, wherein the universal shopping cart is independent from the second merchant website;
determining related items from items in the first list set and the second set list;
in response to determining the related items, populating a related items shopping cart that is separate from the universal shopping cart with the determined related items;
receiving a checkout request for a selected one of the related items;
automatically removing another one of the related items different from the selected one of the related items from both of the universal shopping cart and the related items shopping cart in response to receiving the checkout request;
processing a payment request for an order including the selected one of the related items in response to the user placing the order.

18. The non-transitory computer readable medium of claim 17, wherein the operations further comprise:
generating a first merchant shopping cart and populating the first merchant shopping cart with items on the first set; and
generating a second merchant shopping cart and populating the second merchant shopping cart with items on the second set.

19. The non-transitory computer readable medium of claim 17, wherein determining the related items comprises determining items from the first set and the second set that are related to a same purpose or activity.

20. The non-transitory computer readable medium of claim 17, wherein the operations further comprise accentuating a graphical representation of the other one of the related items in at least one of the universal shopping cart or the related items shopping cart before removing the other one of the related items from the universal shopping cart and the related items shopping cart.

* * * * *

UNITED STATES PATENT AND TRADEMARK OFFICE
CERTIFICATE OF CORRECTION

PATENT NO. : 9,911,149 B2
APPLICATION NO. : 14/602228
DATED : March 6, 2018
INVENTOR(S) : Anthony Shakrala Allen and Norihiro Edwin Aoki It is certified that error appears in the above-identified patent and that said Letters Patent is hereby corrected as shown below:

In the Claims

In Claim 1, Column 18, Line 20, change "first list set" to --first set--.

In Claim 1, Column 18, Line 21, change "second set list" to --second set--.

In Claim 1, Column 18, Line 33, change "the checkout request;" to --the checkout request; and--.

In Claim 10, Column 19, Line 15, change "adding, by one or more" to --adding, by the one or more--.

In Claim 10, Column 19, Line 21, change "first list set" to --first set--.

In Claim 10, Column 19, Line 22, change "second set list" to --second set--.

In Claim 10, Column 19, Line 33, change "the checkout request;" to --the checkout request; and--.

In Claim 17, Column 20, Line 10, change "instruction" to --instructions--.

In Claim 17, Column 20, Line 11, change "executed by the one or more" to --executed by one or more--.

In Claim 17, Column 20, Line 24, change "first list set" to --first set--.

In Claim 17, Column 20, Line 25, change "second set list" to --second set--.

In Claim 17, Column 20, Line 36, change "out request;" to --out request; and--.

Signed and Sealed this
Fifteenth Day of May, 2018

Andrei Iancu
*Director of the United States Patent and Trademark Office*